United States Patent
Tsuzuki (10) Patent No.: US 6,208,358 B1
(45) Date of Patent: Mar. 27, 2001

(54) IMAGE PROCESSING DEVICE, IMAGE PROCESSING METHOD AND STORAGE MEDIUM

(75) Inventor: Hiroyuki Tsuzuki, Tokyo (JP)

(73) Assignee: Kabushiki Kaisha Sega Enterprises, Tokyo (JP)

(*) Notice: Subject to any disclaimer, the term of this patent is extended or adjusted under 35 U.S.C. 154(b) by 0 days.

(21) Appl. No.: 09/129,627

(22) Filed: Aug. 5, 1998

(30) Foreign Application Priority Data

Aug. 6, 1997 (JP) .................................................. 9-211837

(51) Int. Cl.[7] .................................................. G06F 15/00
(52) U.S. Cl. .............................................................. 345/473
(58) Field of Search .................................... 345/473, 474, 345/475; 701/200, 208; 340/990, 995, 996

(56) References Cited

U.S. PATENT DOCUMENTS 5,889,532 * 3/1999 Zhao ...................................... 345/473
6,008,818 * 12/1999 Amakawa et al. .................... 345/473
6,046,689 * 4/2000 Newman ............................... 345/473

* cited by examiner

Primary Examiner—Phu K. Nguyen
(74) Attorney, Agent, or Firm—Finnegan, Henderson, Farabow, Garrett & Dunner, L.L.P.

(57) ABSTRACT

The present invention aims to provide an image processing device whereby the direction of movement of characters can be specified by means of control pad keys only. The image processing device according to the present invention comprises: control pads 2b provided with a plurality of keys for specifying movement positions of characters displayed on image display means 5; and image generating means 1 for generating images whereby the characters move to prescribed positions previously determined in relation to the configuration of said plurality of keys, on the basis of key inputs from the control pads 2b.

19 Claims, 9 Drawing Sheets

| | bit7 | bit6 | bit5 | bit4 | bit3 | bit2 | bit1 | bit0 |
|---|---|---|---|---|---|---|---|---|
| ID — 501 | 0 | 0 | 0 | 1 | \multicolumn{4}{c}{DATA SIZE} | | | |
| 1st Data — 502 | A TRG | B TRG | C TRG | X TRG | Y TRG | Z TRG | L TRG | R TRG |
| 2nd Data — 503 | Right | Left | Down | Up | Start | | | |
| 3rd Data — 504 | \multicolumn{8}{c}{EXPANSION DATA} | | | | | | | |
| ⋮ | \multicolumn{8}{c}{⋮} | | | | | | | |
| ⋮ | \multicolumn{8}{c}{EXPANSION DATA} | | | | | | | |
| ⋮ | \multicolumn{8}{c}{⋮} | | | | | | | |
| nth Data — 505 | \multicolumn{8}{c}{EXPANSION DATA} | | | | | | | |

IMAGE PROCESSING DEVICE, IMAGE PROCESSING METHOD AND STORAGE MEDIUM

BACKGROUND OF THE INVENTION

1. Field of the Invention

The present invention relates to an image processing device, an image processing method and a medium, and more particularly to an image processing device, image processing method and medium, whereby scenes displaying movements or actions of a character are generated on the basis of output signals from a control pad comprising a plurality of keys.

2. Description of the Related Art

With the progress of computer technology, video game devices (image processing devices) using computer graphics technology have become widely used. Of these, video game devices wherein the players' characters are operated and the game is developed according to key input from control pads are especially popular, and a large number of these video game devices have been proposed. A video game device of this kind is disclosed in Japanese Patent Publication 2502473, for example.

However, in the aforementioned conventional video game devices, movement of the players' characters is mainly operated by means of cross-shaped keys. Therefore, in order to carry out a prescribed action (for example, an attack on an enemy character) after moving the player's character, it is necessary for the player to move his or her character by operating the cross-shaped keys, and then subsequently to make an attack on the enemy character operating a button key (for example, ABC keys, XYZ keys, or the like). Furthermore, as the burden of key operation on the player increases, this is liable to cause operational errors, or the like, due to the complexity of key operation. The amount of information to be processed by the game device also rises, thereby increasing the processing load on the CPU.

SUMMARY OF THE INVENTION

The present invention was devised in view of the aforementioned problems, an object thereof being to provide an image processing device, image processing method and storage medium, whereby game programs can be executed by simple key inputs.

More particularly, it is an object of the present invention to provide an image processing device, image processing method and storage medium, whereby characters are moved to prescribed positions according to previously determined correlations, on the basis of key inputs from the control pads, whereupon the characters implement prescribed actions.

In order to achieve the aforementioned objects, the image processing device according to the present invention comprises: control pads provided with a plurality of keys for specifying movement positions of characters displayed on a screen; image generating means for generating images whereby the characters are moved to prescribed positions previously determined in relation to the configuration of the plurality of keys, on the basis of key inputs from the control pads; and image outputting means for displaying the output from the image generating means on the screen. Here, "keys" refers to ABC keys and XYZ keys, as well as the respective right/left/up/down keys of a cross-shaped key.

The image generating means generates images whereby the characters are moved to prescribed positions on the basis of the key input from the control pads, and then generates images whereby the characters implement prescribed actions.

Furthermore, prior to generating images whereby the characters are moved to prescribed positions on the basis of the key input from the control pads, the image generating means may also receive a plurality of key inputs and generate images whereby the characters are moved to prescribed positions corresponding to these respective key inputs.

When the plurality of key inputs from the control pad are input within a predetermined period of time and in a predetermined order, the image generating means may also generate latent images of the characters when generating images whereby the characters are moved to prescribed positions.

The image generating means may also generate images whereby there is a one-to-one correspondence between the configuration of each key provided on the control pad and the movement positions of the characters.

The image generating means may also generate images whereby there is a one-to-one correspondence between combinations of a plurality of key inputs provided on the control pad and the movement positions of the characters.

Moreover, this image processing device may further comprise control means for judging, in cases where there is key input requesting the same processing content with respect to a plurality of characters operated by a plurality of players, whether these key inputs are in a first time period or a second time period corresponding to the image renewal cycle of the image display means, and determining the order of priority relating to the key inputs by the plurality of players in accordance with these judgement results.

By means of this composition, it is possible to determine an order of priority for processing impartially, in cases where two or more players implement key operations requesting the same processing content simultaneously, whilst the same frame is being displayed on the game screen.

The control means may make the first time period correspond to the even-numbered field display time, and the second time period, to the odd-numbered field display time, of the image renewal cycle. The image display means may adjust the frequency of appearance of other game characters displayed by the image display means in accordance with the time interval between key inputs from the control pads. By means of this composition, it is possible to adjust the frequency of appearance of characters in accordance with the movement of players' characters.

The image processing method according to the present invention comprises the steps of: generating operating signals on the basis of key inputs from control pads provided with a plurality of keys for specifying the movement of characters displayed on a screen; and generating images whereby the characters are moved to positions previously correlated to the input keys, on the basis of the operating signals.

In addition to the aforementioned steps, the image generating step may also comprise the steps of: judging whether key inputs are within a first time period or second time period corresponding to periods within the image renewal cycle of image display means, in cases where there are key inputs requesting the same processing content with respect to a plurality of characters operated by a plurality of players; and determining an order of priority for the key inputs of the plurality of players in accordance with these judgement results.

Furthermore, the judging step may make the first time period and second time period correspond respectively to the even-numbered field display time period and the odd-numbered field display time period in the image renewal cycle.

The image generating step may also generate images whereby there is a one-to-one correspondence between the configuration of each key provided on the control pad and the movement positions of the characters.

The image generating step may also generate images whereby there is a one-to-one correspondence between combinations of a plurality of key inputs provided on the control pad and the movement positions of the characters.

The storage medium according to the present invention records programs for causing the image processing device to function as: means (first means) for generating operating signals on the basis of key inputs from control pads provided with a plurality of keys for specifying the movement of characters displayed on the screen of the image processing device; and means (second means) for generating images whereby the characters are moved to positions previously correlated to the input keys, on the basis of the operating signals.

This storage medium may also record programs for causing the image processing device to function as: means (third means) for judging whether key inputs are within a first time period or second time period corresponding to periods within the image renewal cycle of image display means, in cases where there are key inputs requesting the same processing content with respect to a plurality of characters operated by a plurality of players; and means (fourth means) for determining an order of priority for the key inputs of the plurality of players in accordance with these judgement results.

The third means may make the first time period and second time period correspond respectively to the even-numbered field display time period and the odd-numbered field display time period in the image renewal cycle.

The second means may generate images whereby there is a one-to-one correspondence between the configuration of each key provided on the control pad and the movement positions of the characters. The second means may also generate images whereby there is a one-to-one correspondence between combinations of a plurality of key inputs provided on the control pad and the movement positions of the characters.

BRIEF DESCRIPTION OF THE DRAWING

FIG. 7($a$) is a timing chart in a case where key operation requiring the same processing content is implemented by two players in different frames;

FIG. 7($b$) is a timing chart in a case where key operation requiring the same processing content is implemented by two players in the same frame;

DETAILED DESCRIPTION OF THE PREFERRED EMBODIMENTS

The composition of the present invention is now described with reference to FIG. 1 to FIG. 3, whereupon the operational principles thereof will be described with reference to FIG. 4 to FIG. 9.

(Composition)

Figure 1:
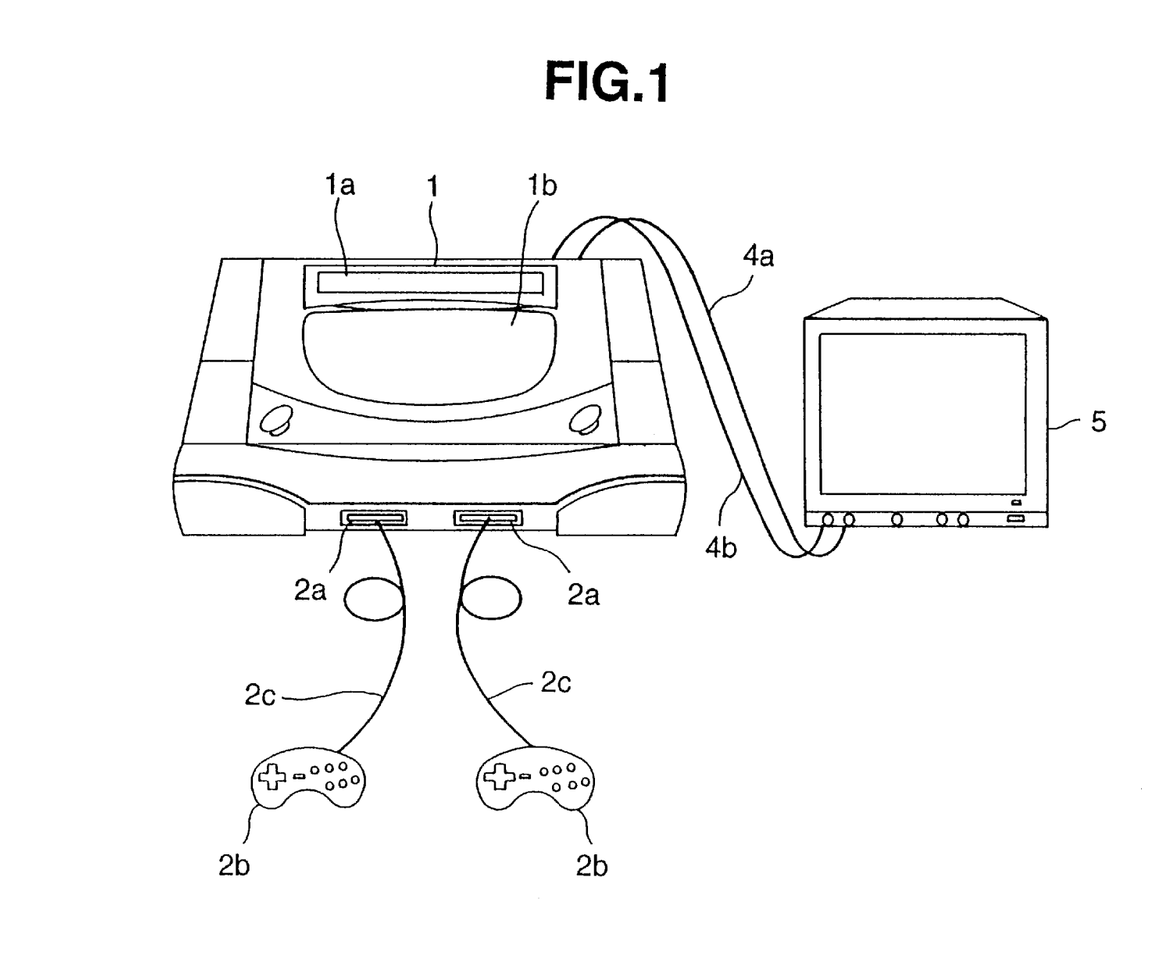
FIG. 1 shows an external view of a game device relating to an embodiment of the present invention.

FIG. 1 is an external view of a video game device incorporating an image processing device relating to a first embodiment of the present invention. In this diagram, the video game device main unit 1 is approximately box-shaped, and a circuit board and the like for game processing are provided inside this main unit. Two connectors 2$a$ are provided on the front of the video game device main unit 1 and PADs 2$b$ for controlling games are connected to these connectors 2$a$ by means of cables 2$c$. If two people are playing a baseball game, for examples, then the two PADs 2$b$ are used.

A cartridge I/F 1$a$ for connecting ROM cartridges and a CD-ROM drive 1$b$ for reading CD-ROMs are provided on the upper portion of the video game device main unit 1. A video output terminal and audio output terminal are provided on the rear face of the video game device main unit 1, but these are not shown in the drawing. The video output terminal is connected to a video input terminal of a TV receiver 5 via a cable 4$a$, and the audio output terminal is connected to an audio input terminal of the TV receiver 5 via a cable 4$b$. In a video game device of this kind, the user plays a game by operating a PAD 2$b$, whilst watching the screens projected on the receiver 5.

Figure 2:
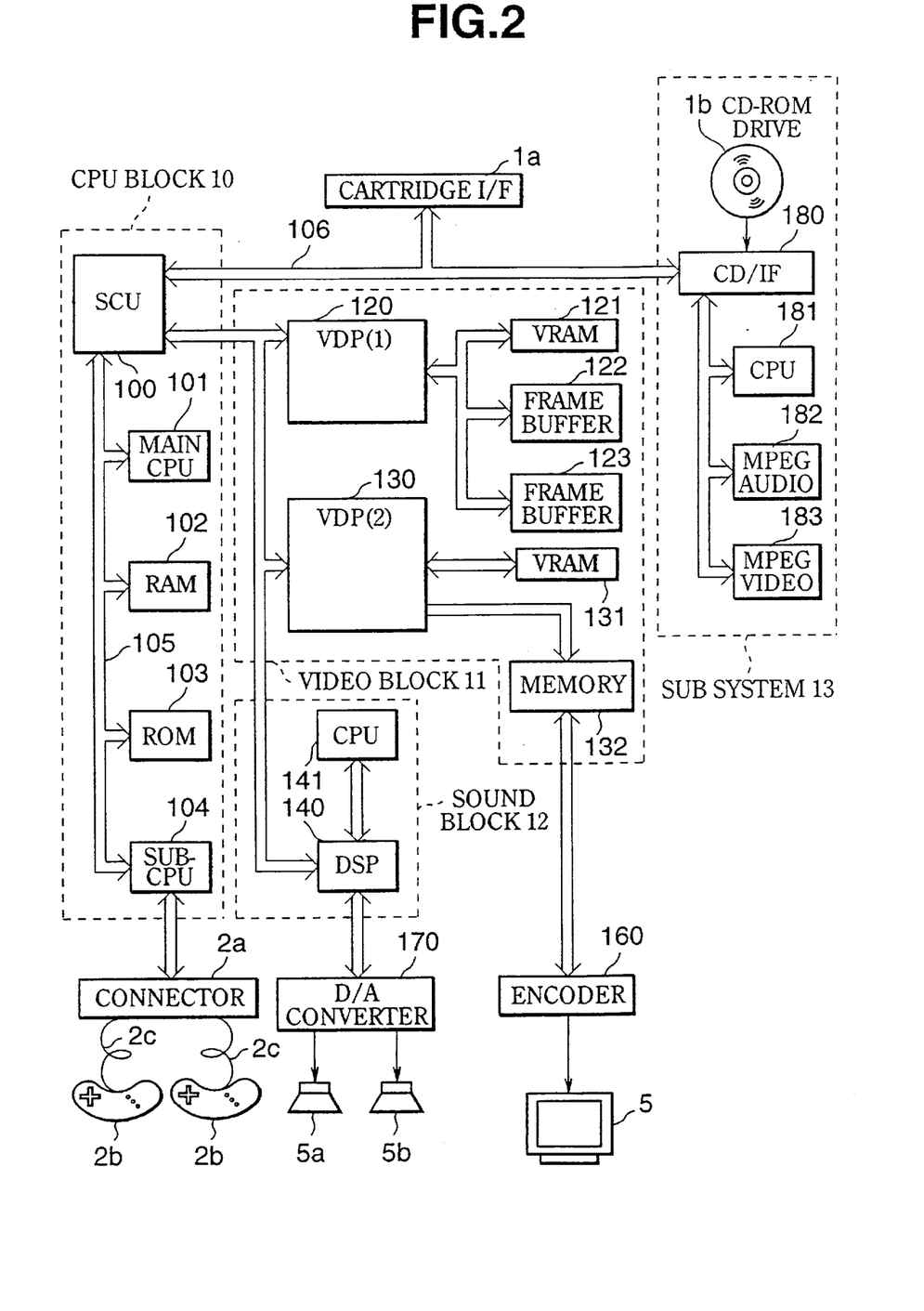
FIG. 2 is a block diagram of a game device relating to an embodiment of the present invention.

FIG. 2 is a block diagram showing the essential elements of a video game device relating to the present embodiment. This image processing device comprises a CPU block 10 for controlling the device as a whole, a video block 11 for controlling the display of game screens, a sound block for generating sound effects, and the like, and a sub-system 13 for reading CD-ROMs, and the like. The CPU block 10 comprises an SCU (System Control Unit) 100, a main CPU 101, RAM 102, ROM 103, cartridge I/F 1$a$, sub-CPU 104, CPU bus 105, and the like.

The main CPU 101 controls the whole device. This main CPU 101 is provided internally with a computing function similar to a DSP (Digital Signal Processor), and it is capable of implementing applicational software at high speed. The RAM 102 is used as a work area by the main CPU 101. Game programs stored on a game cartridge are read into the RAM 102 via the cartridge I/F 1$a$. These game programs comprise various devices for making the game content interesting, for example, a program which records the movements of the player's character and adjusts the frequency of appearance of enemy characters, or the like. Furthermore, a program is also stored which implements impartial priority processing when two or more players implement key operation invoking the same action whilst the same frame is being displayed on the TV receiver 5. Initial programs, and the like, for initialization processing are written into the ROM 103.

The SCU 100 conducts smooth input and output of data between the main CPU 101, VDP 120, 130, DSP 140, CPU 141, and the like, by controlling the buses 105, 106, 107. The SCU 100 is also provided with an internal DSP controller, whereby sprite data in the game can be transferred to the VRAM in the video block 11. By this means, applicational software, such as a game, can be executed at high speed.

The cartridge I/F 1*a* is used for inputting applicational software supplied in ROM cartridge format.

The PAD 2*b* is provided with a cross-shaped key, as well as ABC keys and XYZ keys. The sub-CPU 104 is called an SMPC (System Manager & Peripheral Control), and it comprises a function for gathering peripheral data from the ABC keys, etc. of the PAD 2*b* via the connector 2*a* in response to a request from the main CPU 101. The main CPU 101 conducts processing for moving the player's character in the game screen, for example, on the basis of the peripheral data input by the sub-CPU 104.

Apart from the PAD 2*b*, any other desired peripheral, such as a joystick, keyboard, etc., can be connected to the connector 2*a*. Furthermore, the sub-CPU 104 comprises a function whereby it automatically identifies the type of peripheral connected to the connector 2*a* (main unit terminal), and it gathers peripheral data, and the like, according to a communications format corresponding to the peripheral type.

The video block 11 comprises a VDP (Video Display Processor) 120 for drawing characters, etc., consisting of polygon data for the video game, and a VDP 130 for drawing background scenes, synthesizing polygon image data and background images, and performing clipping processing, and the like. The VDP 120 is connected to the VRAM 131 and the frame buffers 122, 123. Picture data for polygons representing characters in the video game device is transferred from the main CPU 101 via the SCU 100 to the VDP 120. and it is written into the VRAM 121. The picture data written into the VRAM 121 is drawn to the picture frame buffer 122 or 123 in a 16 or 8 bit/pixel format. The data in the drawn frame buffer 122 or 123 is then transferred to the VDP 130. Information for controlling the drawing operation is supplied from the main CPU 101 via the SCU 100 to the VDP 120. The VDP 120 then implements drawing processing in accordance with these instructions.

The VDP 130 is connected the VRAM 131, and is composed such that the image data output by the VDP 130 is supplied via a memory 132 to an encoder 160.

In this case, the VDP 130 is provided with a register for discriminating between image data corresponding to odd-numbered frames and image data corresponding to even-numbered frames in cases where the image data output from the memory 132 to the encoder 160 is to be converted to an NTSC format video signal.

The encoder 160 generates a video signal by appending a synchronizing signal, or the like, to this image data, and this video signal is output to the TV receiver 5.

The sound block 12 comprises a DSP 140 which synthesizes sound according to a PCM format or FM format, and a CPU 141 which controls this DSP 140, and the like. Sound data generated by the DSP 140 is converted to a two-channel signal by a D/A converter 170 and is then output to the speaker 5*b*.

The sub-system 13 comprises a CD-ROM drive 1*b*, a CD I/F 180, CPU 181, MPEG AUDIO 182, MPEG VIDEO 183, and the like. This sub-system 13 comprises a function for reading in applicational software supplied in CD-ROM format, and reproducing animated images, and the like. The CD-ROM drive 1*b* reads in data from a CD-ROM. The CPU 181 implements processing such as controlling the CD-ROM drive 1*b*, and performing error correction on the read data, and the like. The data read in from the CD-ROM is supplied to the main CPU 101 via the CD I/F 180, bus 106 and SCU 100, and it is used as applicational software. Furthermore, the MPEG AUDIO 182 and MPEG VIDEO 183, are devices for restoring data compressed according to MPEG standards (Motion Picture Expert Group). Animated images can be reproduced by restoring MPEG compressed data written on the CD-ROM, by means of the MPEG AUDIO 182 and MPEG VIDEO 183.

Next, the composition of a game device, wherein players' characters are moved using only the keys on the PAD 2*b* (ABC keys, etc.), is described with reference to FIG. 3 to FIG. 5.

Figure 3:
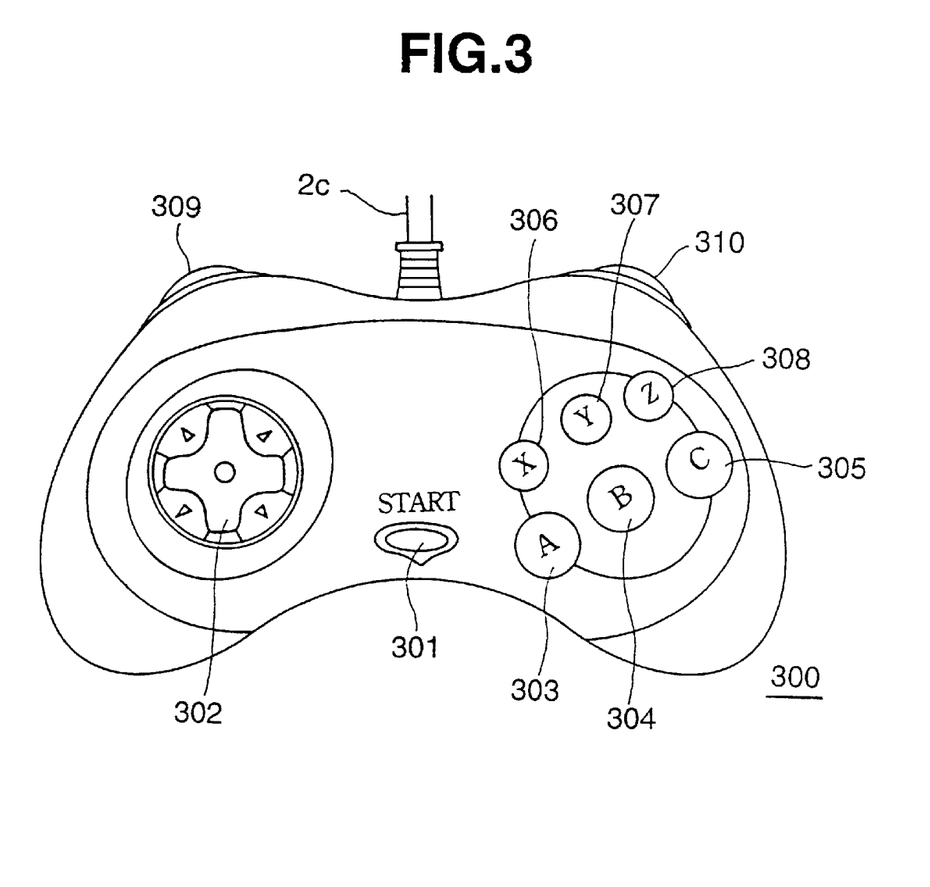
FIG. 3 is an external view of a control pad relating to an embodiment of the present invention.

FIG. 3 shows an external view of a control pad. The control pad 300 comprises: a start key 301, cross-shaped key 302. A key 303, B key 304, C key 305, X key 306, Y key 307, Z key 308. L key 309, R key 310 and a cable 2*c*. Principally, the cross-shaped key 302 is used as a key for moving the character up, down, left and right, and the A key 303–R key 310 are keys for implementing various controls relating to the character, or the like, (for example, attack, defend, etc.).

In the present invention, the up/down/right/left eyes of the cross-shaped key 302 and the A key 303–R key 310 are all called "keys".

(Operational principles)

In the present invention, characters are caused to move by means of the keys (A key 303–R key 310) only, without using the cross-shaped key. This point is described with reference to FIG. 4.

Figure 4:
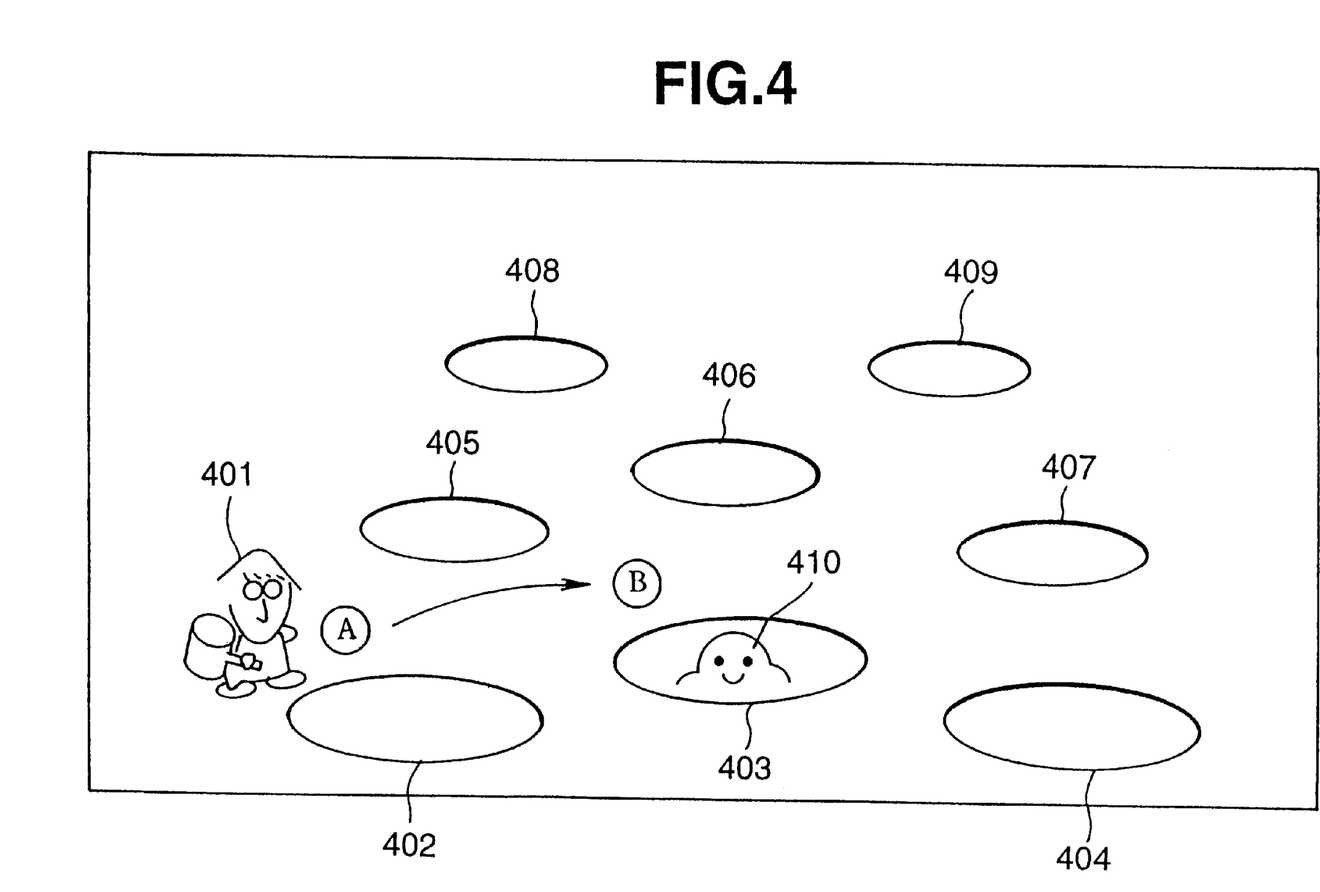
FIG. 4 shows one example of a game screen from a "mole-thumping" game relating to an embodiment of the present invention.

FIG. 4 illustrates a scene from a mole-thumping game. To describe the game contents briefly, the player's character 401 operated by the player scores points by hitting moles 410 which appear from holes 402–409. Two or more players can also play this game simultaneously.

In the present invention, for example, the ABC keys are made to correspond respectively to holes 402, 403, 404, and the XYZ keys are made to correspond respectively to holes 405, 406, 407. Furthermore, the LR keys are made to correspond respectively to holes 408, 409. The player's character 401 can be moved from the position of hole 402 (point P) to the position of hole 403 (point Q) by pressing the B key 304. In this way, operability is improved remarkably compared to conventional games using the cross-shaped key. Moreover, the configuration of the keys and the configuration of the hole positions on the screen can be made to correspond to each other, or be placed in a similar geometrical relationship. This relationship can be grasped readily and directly by the user and therefore operability is improved in this sense also. Furthermore, conventionally, a mole is bashed by operating an attack key after moving the player's character 401 by means of the cross-shaped key, but in the present invention, the player's character 401 can be moved by operating the ABC keys etc., whilst simultaneously bashing a mole. In this way, the player's character 401 is moved by operating a key corresponding to the desired position, whilst the mole is simultaneously attacked by operating the same key, thereby making it possible to simplify game operation and also enabling the processing load on the main CPU 101 to be reduced. The foregoing example describes a case where there is a one-to-one correspondence between the points of movement of the character and the keys, but other correspondence relationships between the keys and character, apart from a one-to-one correspondence, are also included, for example, relationships where one key corresponds to a plurality of characters or positions, or conversely, where a plurality of keys or a combination of keys corresponds to one or a plurality of characters or positions. In short, the present invention may be applied to controlling any preset object or position, rather than movement by vectors based on the cross-shaped key.

Figure 5:
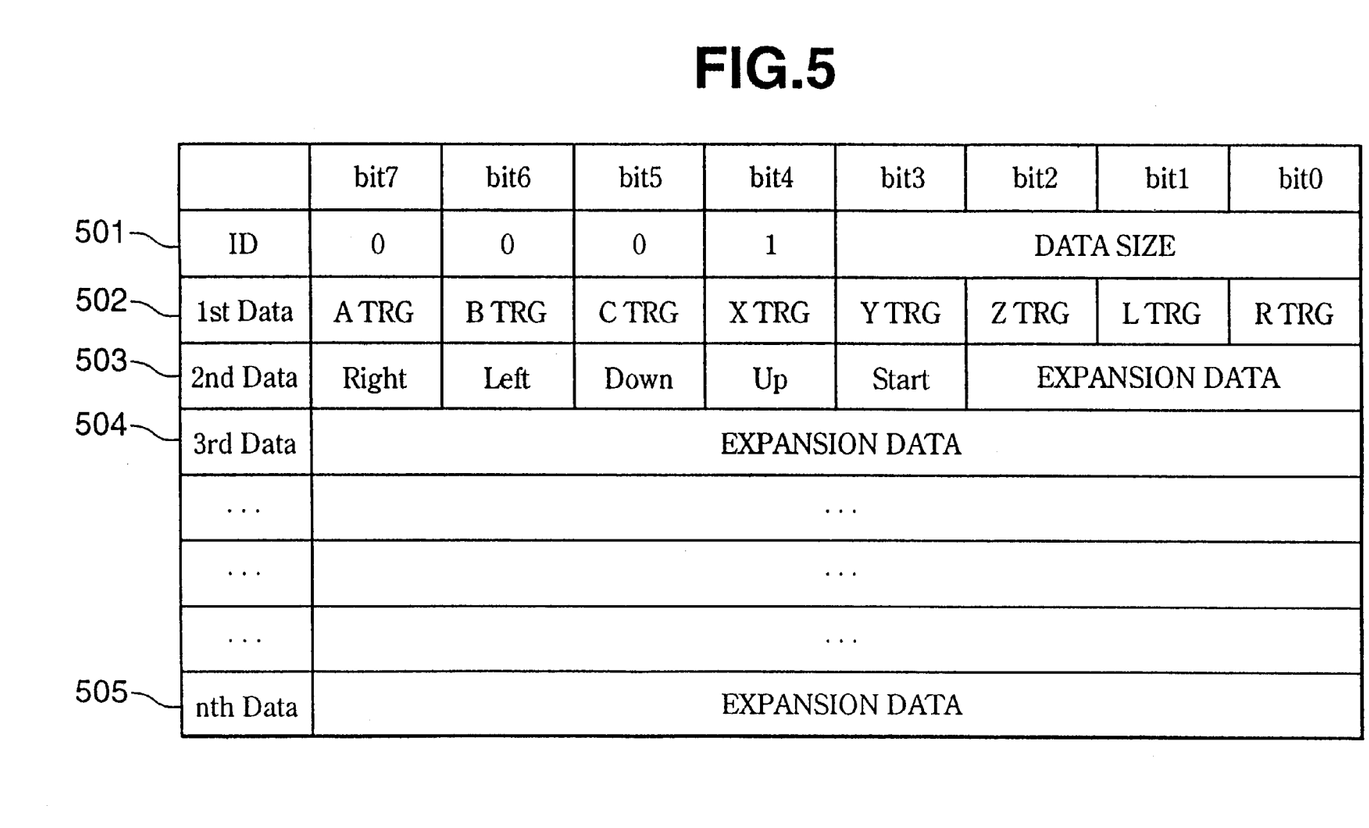
FIG. 5 shows a peripheral data format relating to an embodiment of the present invention.

FIG. 5 shows a peripheral device standard format for the PAD 2*b*. The aforementioned format consists of 8 bits, and comprises peripheral ID 501, 1st Data 502, 2nd Data 503, 3rd Data 504, nth Data 505. The four most significant bits of the peripheral ID 501 indicate the type of peripheral, and in FIG. 4, this is "$1_H$". The four least significant bits indicate the data size, and two bytes is taken as the basic data size. The sub-CPU 104 identifies the type of peripheral connected to the connector 2*a* by means of the peripheral ID 501. The 1st Data 502 holds the signal "A TRG" from the A key, the signal "B TRG" from the B key, the signal "C TRG" from the C key, the signal "X TRG" from the X key, the signal "Y TRG" from the Y key, the signal "Z TRG" from the Z key, the signal "L TRG" from the L key, and the signal "R TRG" from the R key, and when these keys are pressed, the signal becomes "0". The 2nd Data 503 holds the signal (Right, Left, Down, Up) from the cross-shaped key, as well as input signals from the START key and expansion data. The signal "A TRG" from the A key, signal "B TRG" from the B key, and signal "C TRG" from the C key have a 1-to-1 correspondence with holes 402, 403 and 404 shown in FIG. 4, and furthermore, signal "X TRG" from the X key, signal "Y TRG" from the Y key and signal "Z TRG" from the Z key have a 1-to-1 correspondence with holes 405, 406 and 407 shown in FIG. 4. Moreover, signal "L TRG" from the L key and signal "R TRG" from the R key have a 1-to-1 correspondence with holes 408 and 409 shown in FIG. 4.

Consequently, if the player presses, for example, the C key 305 on the PAD 2*b*, "C TRG" in the 1st Data 502 becomes "0", and the main CPU 101 decodes the aforementioned peripheral data from the sub-CPU 104 and then creates a display on the TV receiver 5, wherein the player's character 401 moves to the position of hole 404 and subsequently thumps the mole which appears at hole 404. In this case, the image data for moving the player's character 401, which is drawn to the frame buffer 123, is displayed on the TV receiver 5 over several frames.

Incidentally, the 3rd Data 504, . . . , nth Data 505 hold expansion data, and are provided to conform with expansion etc. of conventional peripheral data.

Furthermore, when a game cartridge is inserted into the cartridge I/F 1*a*, the SCU 100 identifies the type of game and determines whether to use the cross-shaped key or only the ABC keys, etc., for controlling movement of the character. If the character is to be moved using only the ABC keys, etc., then the SCU 100 notifies the sub-CPU 104 of this, and the sub-CPU 104 holds the output signal (hereinafter, called "peripheral data") 502–505 from the control pad 2*b* in the internal register (omitted from drawing). The main CPU 101 then reads in only the 1st Data 502 of the peripheral data 502–505 held in the aforementioned internal register, and implements calculation for moving the character, and the like. Consequently, if the keys of the control pad 2*b* correspond to movement positions of the player's character, as in the mole-thumping game illustrated in FIG. 4, then the main CPU 101 should read out only the 1st Data 502, and therefore the processing load on the main CPU 101 is reduced.

Moreover, by making the movement and attack operations of the player's character correspond to one key, merits are obtained in that the processing load on the main CPU 101 can be reduced and the game operation becomes more straightforward.

Furthermore, in the mole-thumping game illustrated in FIG. 4, in order to generate more interest in the game, processing whereby bonus points are awarded if a mole is hit twice in a short period of time (e.g., $^{40}/_{60}$ths of a second) and the moving image of the player's character 401 remains as a latent image, can be conceived. This processing is implemented as described below. Namely, the VDP 120 reads out a drawing command from the VRAM 121 and writes image data to the frame buffers 122, 123. Information for controlling the drawing operation is set in a register in the VDP 120. The data which has been drawn to the frame buffers 122, 123 is displayed on the TV receiver 5 via the VDP 130, which controls image display. In this case, a plurality of copies of the player's characters displayed on the TV receiver 5 are made in the frame buffers 122, 123, and a priority is set for each player's character. This priority setting is implemented by the VDP 130 and latent images of the player's characters are displayed on the TV receiver 5. According to this composition, if a mole is hit twice within a short period of time (e.g., $^{40}/_{60}$ths of a second), then bonus points are awarded, in addition to which a latent image of the player's character is displayed on the TV receiver 5, thereby increasing the interest generated by the game.

Figure 6:
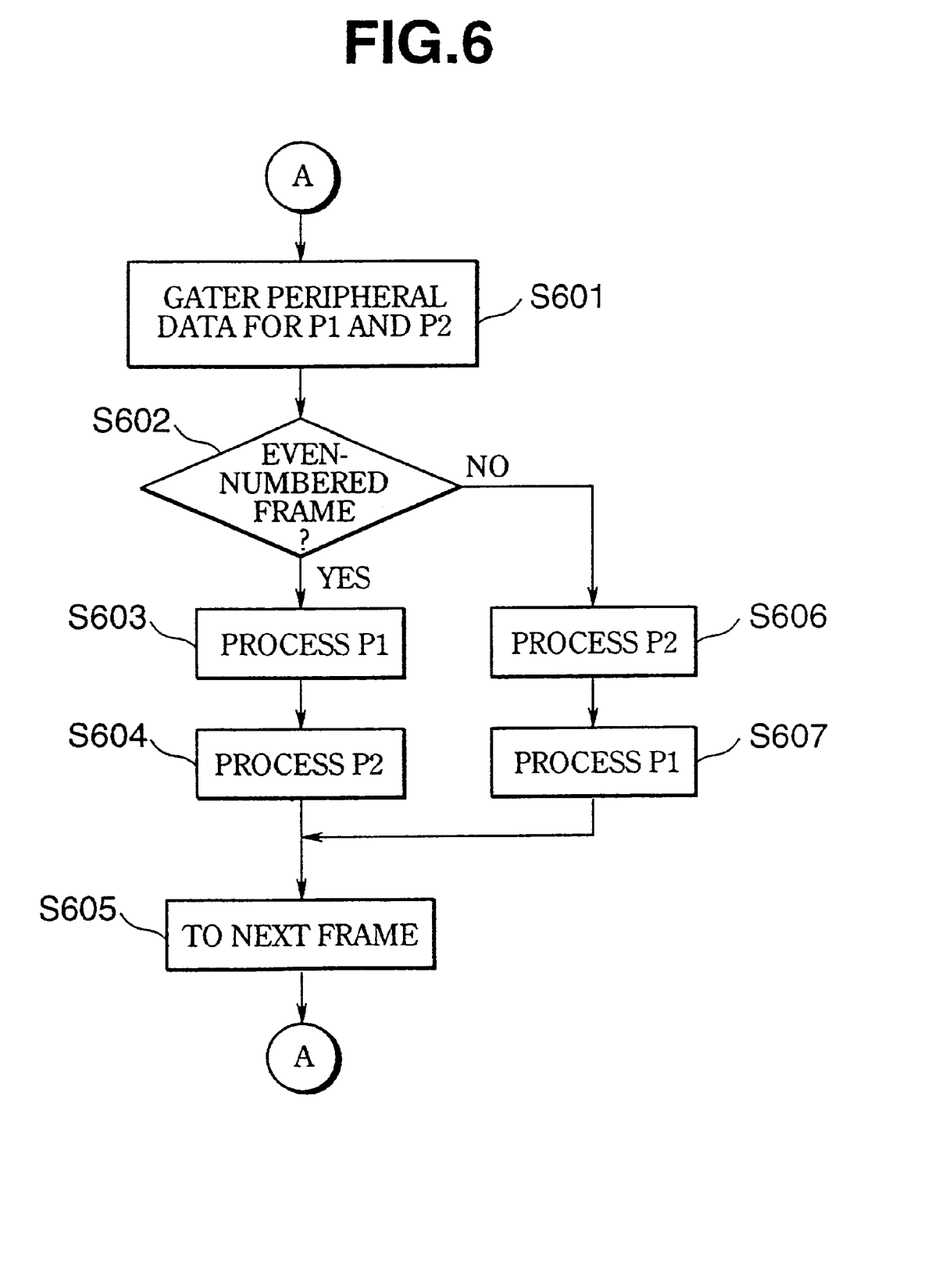
FIG. 6 is a flowchart for determining an order of priority between players relating to an embodiment of the present invention.

Next, the content of image display processing in a case where there have been key inputs requesting the same processing content, whilst the same frame is being displayed, is described with reference to FIG. 6 and FIG. 7. FIG. 6 shows a flowchart for priority processing in a case where two or more players implement a key control, or the like, requesting the same processing content simultaneously, whilst the same frame is being displayed. The following description follows this flowchart.

Peripheral data is read in (S601).

The sub-CPU 104 outputs peripheral data input from a PAD 2*b* via a connector 2*a* to OREG (omitted from diagram), which is the internal register of the sub-CPU 104, as result parameters. Here, the peripheral data may be larger in volume than the capacity of OREG. Therefore, the sub-CPU 104 generates an SMPC interrupt (System Manager & Peripheral Control Interrupt) whenever the OREG capacity becomes full, and requests read-out of peripheral data to the main CPU 101 Furthermore, if there remains peripheral data to be gathered by the main CPU 101, then a 'data present' flag is set in the status register (omitted from diagram), which is an internal register of the sub-CPU 104. After the main CPU 10 has read in the peripheral data, the sub-CPU 104 restarts gathering of peripheral data by means of a 'continue' request issued to the sub-CPU 104. Furthermore, if the peripheral data is unwanted, then the main CPU 101 terminates the gathering of peripheral data by sending a 'break' request to the sub-CPU 104.

Moreover, the aforementioned 'continue' request and the 'break' request are implemented by, for example, reversing flags in prescribed internal registers of the sub-CPU 104.

In this way, if there are two players, the sub-CPU 104 reads in peripheral data from the PADs 2*b* operated by player 1 and player 2 (S401).

In this case, the sequence of processes whereby the main CPU 101 reads in peripheral data, makes prescribed calculations in accordance with the game program stored in the RAM 102, and transmits these calculation results as image data under the control of the VDP 130 to the TV receiver 5, via the memory 132 and encoder 160, in the form of a video signal, is carried out whilst one frame is being displayed on the TV receiver 5. Specifically, the interlace modes (image scanning methods) of the VDP 130 comprise: non-interlace mode, single-density interlace mode, and double-density interlace mode; and in non-interlace mode the aforementioned process is carried out every $^1/_{60}$th of a second, and in single-density interlace mode or double-density interlace mode the aforementioned process is carried out every $^1/_{30}$th of a second. Therefore, if peripheral data requesting the same processing content is input from the PADs 2*b* operated by player 1 and player 2, whilst the same frame is being displayed on the TV receiver 5, namely, within a period of 1/60th of a second or 1/30th of a second, (e.g., in a mole-thumping game, this corresponds to two players' characters simultaneously hitting a mole appearing at the same hole,) then a problem arises with respect to the order of priority in which these inputs are to be processed.

This point is now described with reference to FIG. 7. FIG. 7 shows timing charts in cases where two players implement key operations requesting the same processing content, whilst different frames are displayed on the TV receiver 5 in the case of FIG. 7(a), and whilst the same frame is being displayed on the TV receiver 5 in the case of FIG. 7(b).

Figure 7A:
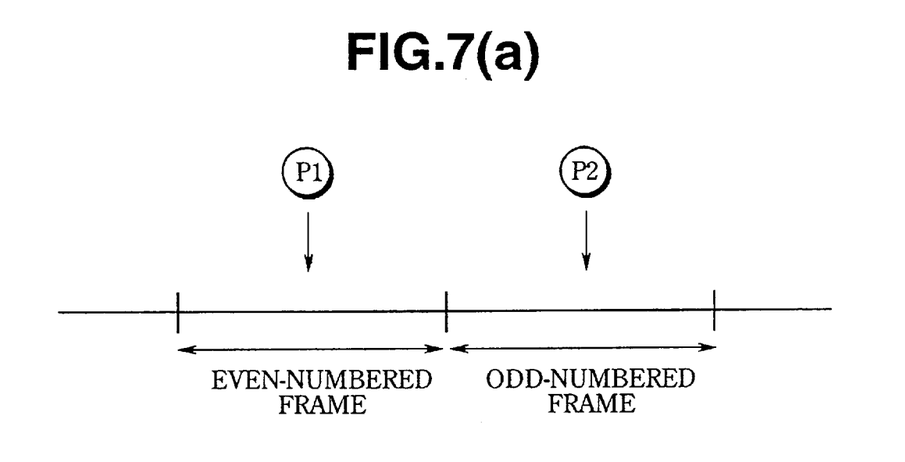
Figure 7B:
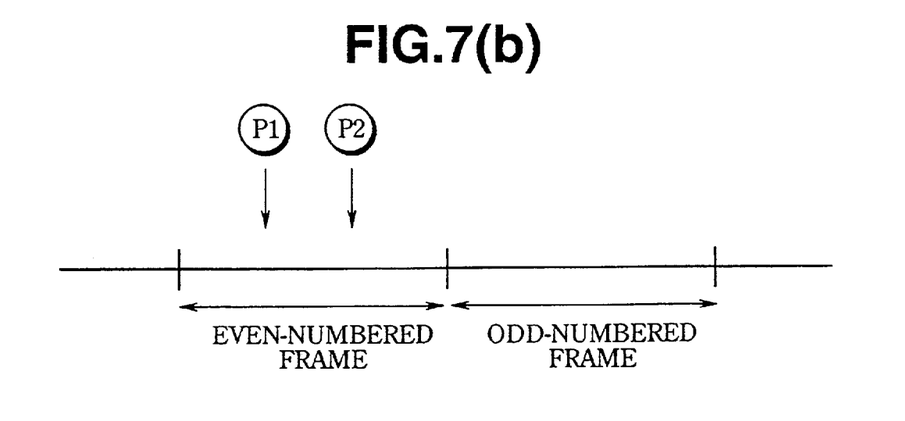

For example, in the case of the aforementioned mole-thumping game, if player 1 (P1) presses the X key 306 on the PAD b during an even-numbered (2N) frame, and player 2 (P2) presses the X key 306 on the PAD 2b during an odd-numbered (2N+1) frame, as illustrated in FIG. 7(a), then processing is carried out in the order in which the X keys 306 were pressed, in other words, in the order of player 1 (P1), then player 2 (P2). Consequently, after the character belonging to player 1 (P1) has moved to hole 405, the character belonging to player 2 (P2) is moved to hole 405.

On the other hand, if player 1 (P1) and player 2 (P2) implement key operations requesting the same processing content, e.g., they press the X keys 306 on their pads, during the same frame, as illustrated in FIG. 7(a), then the character belonging to player 1 (P1) and the character belonging to player 2 (P2) cannot be moved to hole 405 simultaneously. Furthermore, even if player 1 (P1) implements the key operation before player 2 (P2) within the same frame, when the main CPU 101 reads in peripheral data from the sub-CPU 104 at the same timing as the image renewal cycle of the TV receiver 5, it will not recognize that one data item has been input before another.

Therefore, if player 1 (P1) and player 2 (P2) implement key operations requesting the same processing content within the same frame, processing is carried out in accordance wit step S602 onwards.

It is determined whether or not the frame is an even-numbered frame (S602).

The VDP 130 contains a screen status register indicating the TV scanning status (omitted from drawings). This screen status register is a 16-bit register and comprises an external latch flag, external synchronization flag, Vblank flag, Hblank flag, scanning field flag and TV format flag. The scanning field flag indicates the scanning status when the TV receiver 5 is in interlace mode; if the scanning is in an even-numbered field then the flag is "0", and if the scanning is in an odd-numbered field then the flag is "1".

Accordingly, if the scanning operation is in an even-numbered field (YES at step S602), then priority is given to processing relating to player 1 (S603), and processing for player 2 is carried out subsequently (S604). Describing this by means of the example in FIG. 7(b), if player 1 (P1) and player 2 (P2) implement key operation requesting the same processing content, e.g. they press the X buttons 306 on their PADs 2b, during the same frame (even-numbered frame), then the character belonging to player 1 (P1) will be moved to hole 405 first, whereupon the character belonging to player 2 (P2) is moved to hole 405. The process then moves to the next frame (odd-numbered frame) (S605), and returns to S601.

If, on the other hand, the scanning operation is in an odd-numbered frame, (NO at step S602), then priority is given to processing relating to player 2 (S606), and processing relating to player 1 is carried out subsequently (S607).

In this way, if two players perform an operation invoking the same processing content simultaneously, the order of priority of processing is determined according to the status of the scanning field flag at that time, and therefore the game can be implemented impartially.

Figure 8:
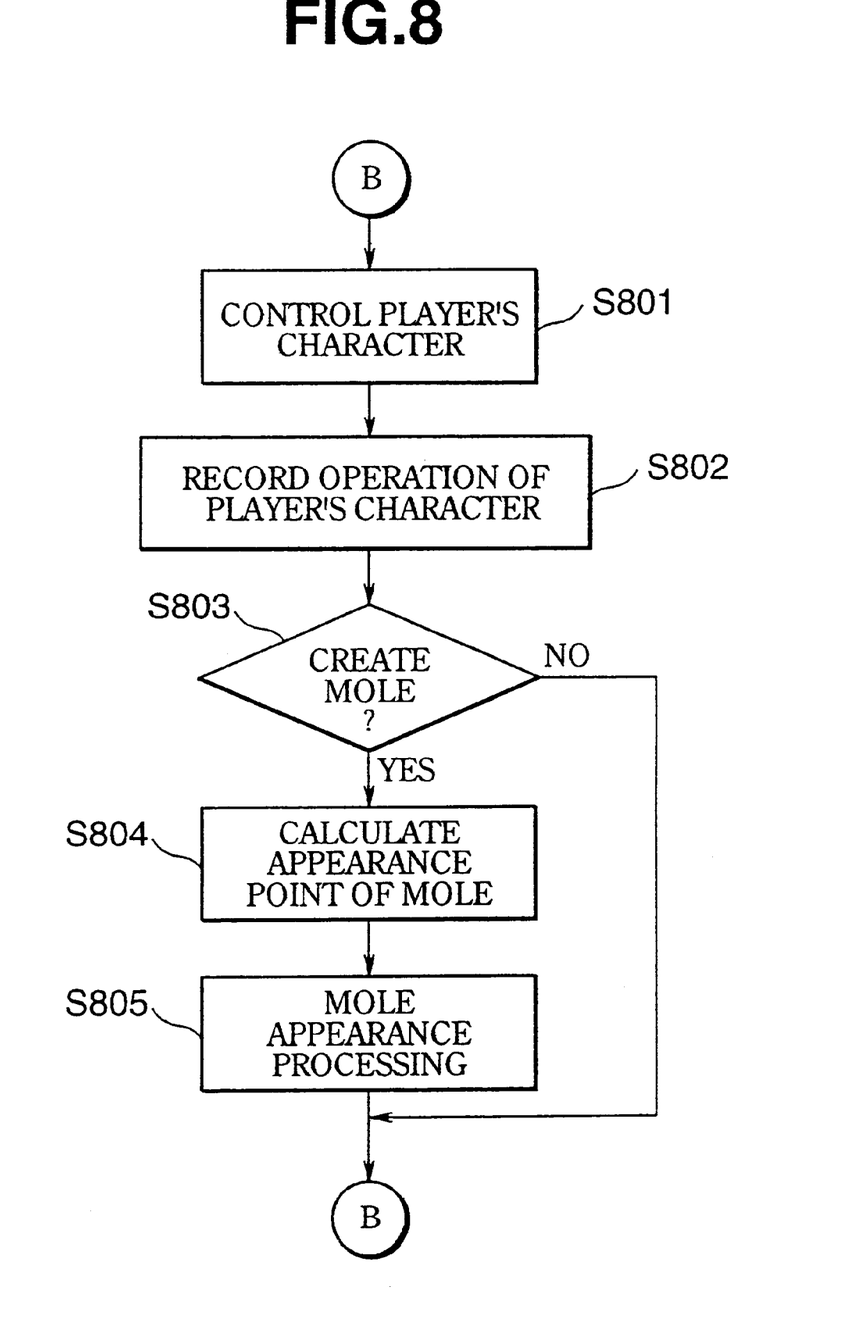
FIG. 8 is a flowchart for controlling the frequency of appearance of an enemy character in response to the movement of a player's character.

Next, a procedure for controlling the frequency of appearance of other characters (e.g., enemy characters) in response to the movement of the players' characters, is described. FIG. 8 depicts this processing in the form of a flowchart, using a mole-thumping game as an example. The description below follows this flowchart. The player operates his or her character in response to the development of the game (S801). The movement of the player's character is stored in a RAM 102 (S802). In the case of a mole-thumping game, for example, a record of movement of the player's character, such as how long the character wailed at a hole, and at which hole the character hit an appearing mole, etc., is stored in the RAM 102.

Thereupon, if a mole is to appear at any of the holes (YES at S803), then the main CPU 101 calculates the point of appearance of the mole (S504).

The point of appearance of the mole is calculated at random, or following prescribed rules, in accordance with the game program stored in the RAM 102. In this case, if the player's character waits for a long period of time at a particular hole in an attempt to hit a mole appearing at that hole, then the flag of appearance of moles at that hole is reduced.

Figure 9:
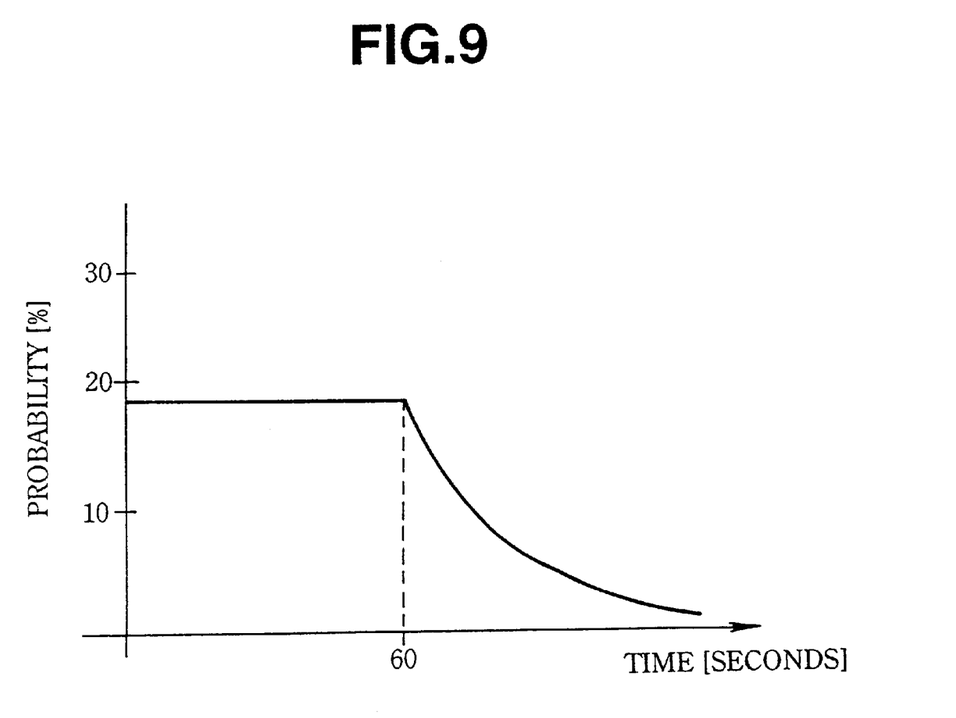
FIG. 9 is a chart illustrating change in the frequency of appearance of the enemy character against time.

This point is described with reference to FIG. 9. FIG. 9 is a diagram depicting the frequency of appearance of a mole at hole 405, for example, against the passage of time. Initially, the frequency of appearance of moles at hole 405 is set to 18%, but since the player's character waits at hole 405 for a prescribed period of time (e.g., 60 seconds), aiming to hit a hole appearing at hole 405, then after the prescribed period of time has elapsed, the frequency of appearance of moles at hole 405 is reduced. This example shows the change in the frequency of appearance of moles in a case where the player's character waits continuously for a pre-scribe time at hole 405, but it may also be applied to cases where the character moves temporarily to another hole and then moves back to hole 405. In other words, at S804, if a mole is to be made to appear at hole 405 when the appearance point of the mole is calculated, the amount of time since the player's character moved to hole 405 is calculated and if the player's character has been at hole 405 for 80% of the prescribed time, the frequency of appearance at hole 405 can be reduced.

In this way, the appearance of moles is processed by calculating the appearance point of the moles (S805).

According to the present invention, since it is possible to control the frequency of appearance of enemy characters in response to the movement of players' characters, then it is possible to outsmart a player who is taking a low-risk approach. Furthermore, the difficulty of the game can be adjusted freely according to the player's level of skill.

Therefore, it is possible to prevent a game from progressing in an easy fashion, thereby creating more interest in the game. Moreover, if the probability of the player hitting a mole appearing at a particular hole is very low, it is possible to raise the probability of moles appearing at that hole.

Furthermore, the present invention is not limited to a mole-thumping game, by may also be applied to any type of competitive game.

As described above, according to the present invention, it is possible, for example, for the direction of movement of a character in a video game device to be specified by means of control pad keys only. Furthermore, according to the present invention, it is also possible for impartial processing to be implemented in cases where two or more players implement key operation requesting the same processing content, simultaneously. Moreover, according to the present invention, it is possible to control the frequency of appearance of enemy characters in response to the movement of players' characters. The level of difficulty of a game can also be adjusted freely.

What is claimed is:

1. An image processing device comprising:

control pads provided with a plurality of keys for specifying movement positions of characters displayed on a screen;

image generating means for generating images in which said characters are moved to prescribed positions previously determined in relation to the configuration of said plurality of keys, on the basis of key inputs from said control pads; and image outputting means for displaying the output from said image generating means on said screen.

2. The image processing device according to claim 1, wherein images in which said characters are moved to prescribed positions on the basis of the key input from said control pads are generated, and then images in which said characters implement prescribed actions are generated.

3. The image processing device according to claim 2, wherein, prior to generating images in which said characters are moved to prescribed positions on the basis of the key input from said control pads, said image generating means receives a plurality of key inputs, and generates images in which said characters are moved to prescribed positions corresponding to these respective key inputs.

4. The image processing device according to claim 3, wherein, when said plurality of key inputs from said control pad are input within a predetermined period of time and in a predetermined order, said image generating means generates latent images of said characters when generating images in which said characters are moved to prescribed positions.

5. The image processing device according to claim 4, wherein said image generating means generates images in which there is a one-to-one correspondence between the configuration of each key provided on said control pad and the movement positions of said characters.

6. The image processing device according to claim 4, wherein said image generating means generates images in which there is a one-to-one correspondence between combinations of a plurality of key inputs provided on said control pad and the movement positions of said characters.

7. The image processing device according to claim 1, further comprising control means for judging, in cases where there is key input requesting the same processing content with respect to a plurality of characters operated by a plurality of players, whether these key inputs are in a first time period or a second time period corresponding to the image renewal cycle of the image display means, and determining the order of priority relating to the key inputs by said plurality of players in accordance with these judgement results.

8. The image processing device according to claim 7, wherein said control means makes said first time period correspond to the even-numbered field display time, and said second time period, to the odd-numbered field display time, of the image renewal cycle.

9. The image processing device according to claim 1, wherein said image display means adjusts the frequency of appearance of other game characters displayed by said image display means in accordance with the time interval between key inputs from said control pads.

10. An image processing method comprising th steps of:

generating operating signals on the basis of key inputs from control pads provided with a plurality of keys for specifying the movement of characters displayed on a screen; and generating images in which said characters are moved to positions previously correlated to the input keys, on the basis of said operating signals.

11. The image processing method according to claim 10, further comprising the steps of judging whether key inputs are within a first time period or second time period corresponding to periods within the image renewal cycle of image display means, in cases where there are key inputs requesting the same processing content with respect to a plurality of characters operated by a plurality of players; and determining an order of priority for the key inputs of said plurality of players in accordance with these judgement results.

12. The image processing method according to claim 11, wherein said judging step makes said first time period and second time period correspond respectively to the even-numbered field display time period and the odd-numbered field display time period in the image renewal cycle.

13. The image processing method according to claim 12, wherein said image generating step generates images in which there is a one-to-one correspondence between the configuration of each key provided on said control pad and the movement positions of said characters.

14. The image processing method according to claim 13, wherein said image generating step generates images in which there is a one-to-one correspondence between combinations of a plurality of key inputs provided on said control pad and the movement positions of said characters.

15. A storage medium on which programs are recorded for causing said image processing device to function as:

first means for generating operating signals on the basis of key inputs from control pads provided with a plurality of keys for specifying the movement of characters displayed on the screen of said image processing device; and second means for generating images in which said characters are moved to positions previously correlated to the input keys, on the basis of said operating signals.

16. The storage medium according to claim 15, whereon programs are recorded for causing said image processing device to function as third means for judging whether key inputs are within a first time period or second time period corresponding to periods within the image renewal cycle of image display means, in cases where there are key inputs requesting the same processing content with respect to a plurality of characters operated by a plurality of players;

and fourth means for determining an order of priority for the key inputs of said plurality of players in accordance with these judgement results.

17. The storage medium according to claim 16, wherein said third means makes said first time period and second time period correspond respectively to the even-numbered field display time period and the odd-numbered field display time period in the image renewal cycle.

18. The storage medium according to claim 17, wherein said second means generates images in which there is a one-to-one correspondence between the configuration of each key provided on said control pad and the movement positions of said characters.

19. The storage medium according to claim 18, wherein said second means generates images in which there is a one-to-one correspondence between combinations of a plurality of key inputs provided on said control pad and the movement positions of said characters.

* * * * *